US006428679B1

(12) United States Patent
Bourges et al.

(10) Patent No.: US 6,428,679 B1
(45) Date of Patent: Aug. 6, 2002

(54) ELECTROLYTIC METHOD FOR THE RECOVERY AND RECYCLING OF SILVER FROM A NITRIC ACID SOLUTION

(75) Inventors: Jacques Bourges, Richland, WA (US); Jean-Charles Broudic, Villeneuve Lez Avignan (FR); Jacques Dauby, Camoncet/Aigus (FR); Isabelle Leboucher, Versailles (FR); Olivier Leclerc, Veneux les Sablons (FR); Pascal Baticle, Nonville (FR)

(73) Assignees: Commissariat A l'Energie Atomique, Paris; Compagnie Generale des Matieres Nucleaires, Valizy-Villacoublay, both of (FR)

( * ) Notice: Subject to any disclaimer, the term of this patent is extended or adjusted under 35 U.S.C. 154(b) by 0 days.

(21) Appl. No.: 09/381,663
(22) PCT Filed: Mar. 23, 1998
(86) PCT No.: PCT/FR98/00580
§ 371 (c)(1), (2), (4) Date: Nov. 9, 1999
(87) PCT Pub. No.: WO98/42894
PCT Pub. Date: Oct. 1, 1998

(30) Foreign Application Priority Data

Mar. 24, 1997 (FR) .............................................. 97 03552

(51) Int. Cl.[7] ................................................. C25C 1/20
(52) U.S. Cl. ..................................................... 205/571
(58) Field of Search .......................................... 205/571

(56) References Cited

U.S. PATENT DOCUMENTS 4,670,115 A * 6/1987 Prior et al. .................. 205/571
5,135,624 A * 8/1992 Tan et al. ................ 205/571 X
6,126,720 A * 10/2000 Okada et al. ........... 205/571 X

OTHER PUBLICATIONS

J. Bourges et al., "Dissolution Du Bioxyde De Plutonium En Milieu Nitrique Par l'Age (II) Electrogenere", (J. of the Less Common Metals), 122 (1986) pp. 303–311 (No Month).
D. Blanchard et al., "Recovery of Silver from CEPOD Anolyte Solutions", Final Report–PNL–10164 UC 721, Sep. 1994.

* cited by examiner

Primary Examiner—Donald R. Valentine
(74) Attorney, Agent, or Firm—Pearne & Gordon LLP

(57) ABSTRACT

This invention relates to an electrolytic method for the selective recovery and recycling of silver from a nitric acid solution containing it in the form of Ag(I), this method comprising successive steps of electro-deposition of the silver in the form of silver metal Ag(0), and then of redissolution of the deposited silver Ag(0), to give a final solution of Ag(I) in which the step of electro-deposition is carried out at a prescribed current and the successive steps of electro-deposition of the silver and of redissolution of the deposited silver are carried out in the same apparatus. The invention is applicable particularly to the selective recovery of Ag(I) by reduction to Ag metal from nitric acid solutions arising from the processing of plutonium containing waste in plants for the reprocessing of nuclear fuels and to the redissolution of the silver metal to form Ag(I) with the purpose of recycling it to an upstream point of the method.

19 Claims, 1 Drawing Sheet

ELECTROLYTIC METHOD FOR THE RECOVERY AND RECYCLING OF SILVER FROM A NITRIC ACID SOLUTION

This application is a 371 of PCT/FR98/00580 Mar. 23, 1998.

This invention relates to an electrolytic method for the selective recovery and recycling of silver from a nitric acid solution containing silver in the form of Ag(I), this method comprising successive steps of electro-deposition and of redissolution of the deposited silver Ag(0).

The invention is particularly applied to the selective recovery of Ag(I) by reduction to Ag metal from nitric acid solutions arising from the processing of plutonium containing waste in plants for the reprocessing of nuclear fuels and to the redissolution of the silver metal to form Ag(I) with the purpose of recycling it to an upstream point of the method.

The use of an electrolytic method to recover metallic silver from solutions or from effluents notably containing silver ions has been known for a long time.

Hence, document FR-A-0 704 663 describes a method of separating silver in the metallic state by electrolysis of hyposulfite solutions containing silver ions Ag(I), used, in particular, in photography.

This method consists of adding to the solution to be treated, apart from gelatin, a specific activating agent containing sulfur that is intended, during the electrolysis, to provide very slight cathodic deposits of silver sulfide. This document is only concerned with the extremely specific problem of electrolysis of the silver from hyposulfite baths and contains no disclosures that could be applied to the electrolysis of nitric acid solutions; furthermore, the redissolution of the deposited silver is certainly not described.

Document U.S. Pat. No. 4,226,685 relates to a method for the removal of heavy metals such as silver and cyanide ions from effluents from electrolytic plating which uses an electrolysis apparatus in a single enclosure, with no separate compartment, comprising cathodes with a high specific surface area formed from a bed of conductive particles. Both the specific treatment of nitric acid effluents and possible redissolution of the metal, for example deposited silver, are certainly not described, it only being mentioned that the cathodes on which the metals are to be found, are dismantled, removed from the apparatus, and later processed by traditional purification techniques.

In an analogous way, document FR-A-0 699 738 relates to an electrolytic "depollution" reactor for the treatment of effluents containing heavy metals that comprises a single tank in which electrodes of opposite polarity are alternately positioned, the cathodes preferably being in the form of detachable high volume electrodes with a granular filling, for example based on petroleum coke.

Once again, the processing of nitric acid solutions notably silver solutions is not touched on. The recovery of the deposited metal takes place by removing the detachable cathode and processing the granular bed in the traditional way outside of the tank, in order to recover the metal.

The problem of recovering and recycling silver from nitric acid solutions is posed in a particularly acute way in plants for the reprocessing of nuclear fuel.

In these plants, the remarkable aptitude that the Ag(II) species has for "quasi-instantaneously" dissolving plutonium dioxide in a nitric acid medium is made use of. This is described particularly in documents by J. BOURGES, C. MADIC, G. KOEHLY, M. LECOMTE "Dissolution du bioxyde de plutonium en milieu nitrique par l'Ag(II) électrogénéré" J. of the Less Common Metals, p. 122, 303, 1968 and the document by M. LECOMTE, J. BOURGES, C. MADIC "Applications du procédé de dissolution oxydante du bioxyde de plutonium" in Proceedings of the In. Conf. On Nucl. Fuel Reprocessing and Waste Management RECOD 87, Vol. 1, p. 444, 1987.

Because of this, the use of the Ag(II)/Ag(I) redox couple has become progressively more important over the last few years in reprocessing plants such as that at La Hague, as is mentioned in the document by F. J. PONCELET, M. H. MOULINEY, V. DECORBERT, M. LECOMTE "Industrial Use of Electro-generated Ag(II) for $PuO_2$ Dissolution RECOD 94 Proceedings", Vol. II, p. 24–28 April 1994, London—United Kingdom.

In particular, the technique of "oxidizing" dissolution of $PuO_2$ with Ag(II) electro-generated from silver salts and notably from $AgNO_3$, must be used for the processing of certain plutonium containing wastes as pointed out in the document by J. BOURGES, M. LECOMTE, J. C. BROUDIC, M. MASSON, D. LALAQUE, J. P. LECOURT "Décontamination des déchets solides contaminés en émetteurs alpha, beta, gamma, en vue de leur déclassement en terme de stockage" EUR 15 804 FR, 1994 and the document by M. H. MOULINEY, F. J. PONCELET, P. MIQUEL, V. DECORBERT, M. LECOMTE "Electrogenerated Ag(II) for Recovery of $PuO_2$ from Waste" ENC 94, 286 1994, Lyon, France.

However, this introduction of silver in the form of $AgNO_3$ in the downstream part of the cycle does pose numerous problems for the treatment of the effluents created which are sent at the end of the cycle for vitrification.

Cost constraints on the one hand and constraints linked to the quality of the vitrified waste on the other hand require that the quantity of silver introduced into the glasses be limited.

It is therefore necessary to recover the silver found in the form of Ag(I) in the concentrated nitric acid solutions arising from the reprocessing.

Among the methods for recovering the silver from nitric acid solutions contaminated with alpha emitters, a process is known, on the one hand, of reducing and precipitating the Ag(I) as Ag(0) with ascorbic acid, usually with the addition of anti-nitrous reactants hydrazine, hydroxylamine nitrate and on the other hand a method of reducing the Ag(I) to Ag(0) carried out in an electrolytic unit with a separate compartment.

These methods are described respectively in documents by E. J. WHEELWRIGHT, L. A. BRAY, J. L. RYAN "Apparatus and Methods for Dissolving Hazardous Waste Materials by Catalyzed Electrochemical Dissolution" WO-A-89/10981, November 1989 and by D. BLANCHARD, J. E. SUMMA, D. L. ALEXANDER, E. J. SHADE, J. D. MATHESON, T. E. BOYD, D. L. COCHRAN, E. J. WHEELWRIGHT "Recovery of Silver from CEPOD Anolyte Solutions" Final Report -PNL- 10164 UC 721, September 1994.

The method of separating silver by precipitation has two disadvantages, namely the use of large quantities of reducing agents and anti-nitrous agents often undesirable and difficult to degrade, poses difficulties for the subsequent management of the effluents and the need for a solid/liquid separation to be carried out.

The electro-deposition method such as the one used in the document by WHEELWRIGHT already mentioned above, has the major disadvantage of using an apparatus with a separate compartment with a high ohmic drop, while the possibility of redissolution is neither described nor considered.

The methods described in documents U.S. Pat. No. 4,226,685 and EP-A-0 449 735 which use electrolysis equipment with a single compartment and which do not touch on the specific problem of the processing of nitric acid solutions, have the major disadvantage of including a possible redissolution step that is separate both in space and in time. This step is carried out in an off-line fashion in an installation that is independent of the electrolysis unit.

Such a disadvantage is even more of a problem in the case of processing solutions that contain radioactive elements.

Document JP-A-05 188 187 describes, according to its abstract, the recovery of metals from a nitric acid dissolution solution that arises, for example, from the dissolution of spent nuclear fuel. The method described in this document uses electrolysis at a controlled potential without the addition of anti-nitrous compounds.

Consequently, the objective of the invention among others is to correct the disadvantages of the methods of the prior art.

These objectives and others are achieved in accordance with the invention by an electrolytic method of selective recovery and recycling of the silver from an initial nitric acid solution containing it in the form of Ag(I), comprising successive steps of electro-deposition of the silver Ag(0), and then redissolution of the deposited silver Ag(0) to give a final solution of silver Ag(I), in which said electro-deposition step is carried out with a prescribed current and said successive steps of the electro-deposition of the silver, and of redissolution of the deposited silver are carried out in the same apparatus.

The method according to the invention therefore allows one to overcome two of the disadvantages inherently linked to the methods of the prior art described above.

On the one hand, it does not make use of any agents such as reducing agents that are difficult to degrade. All of the products used are in effect, products that can be easily degraded and do not any problems during subsequent treatment of the effluents. In particular, it is possible to avoid a solid/liquid separation which is difficult to carry out in an active environment.

On the other hand, the fact that the steps of recovering the silver Ag(0) and redissolving it are integrated within the same apparatus leads to an important simplification of the process, to the installations being much more compact, to a reduction in the number of pipes and other devices for the passage of fluids and solids etc.

All these advantages of the method are particularly important in an active environment.

The gain in space is accompanied by a gain in time since neither the redissolution process nor the recycling is carried out off-line on a specially designed site.

Consequently, the method of the invention is much more economic than the methods of the prior art. Furthermore the fact that the electro-deposition step is carried out at a prescribed current means that compared with methods operating at a controlled potential the electro-deposition time is limited. In effect it is the current that governs the quantity of silver deposited.

BRIEF DESCRIPTION OF THE DRAWINGS

The invention will now be described in greater detail, making reference to the appended drawings in which.

Figure 1:
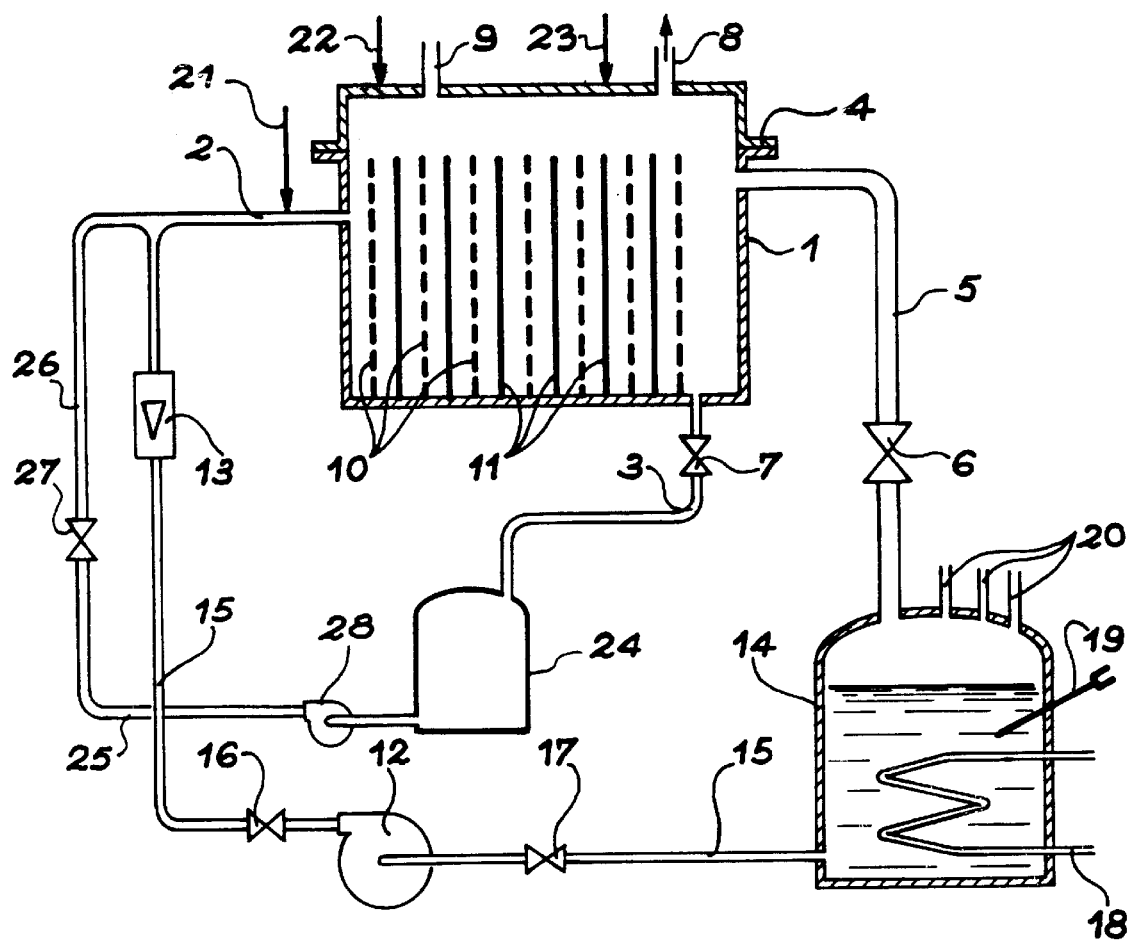
FIG. 1 is a functional diagram of a "desilvering" installation for the implementation of the method according to the invention, comprising in particular an electrolytic unit without a separate compartment and constituted by a single enclosure.

The method according to the invention for the recovery and recycling of the silver therefore allows one to recover silver selectively from a nitric acid solution containing it.

This solution can be any notably aqueous solution containing silver in the form Ag(I) (Ag$^+$); the silver Ag(I) concentration of the solution to be treated preferably being from 0.01 to 0.1 mol/l.

The solution is a nitric acid solution, that is to say that it contains nitric acid HNO$_3$, preferably at a concentration of from 0.1 to 6 mol/l; for example 5 mol/l.

The treated solution may include, apart from Ag(I) ions, one or more other cations, generally called "interfering cations". These cations are generally cations of metals belonging, for example, to the group formed by Fe, Ni, Cr, Mn, Mg and Zn and they are each generally present at a concentration that is less than or equal to 0.1 mol/l, for example, less than or equal to 0.05 mol/l.

According to one of its particularly advantageous characteristics, the method according to the invention, does not only allow quantitative deposition with an electro-deposition yield close to 100% silver from a solution containing interfering cations, but also selective deposition, that is to say that the deposited silver Ag(0) is of high purity: namely generally higher than 90%.

The nitric acid solution can be in particular, a nitric acid solution arising from the processing of plutonium containing waste by the PUREX process. The nitric acid solution containing the silver in the form of Ag(I) may therefore, in addition, include one or more radioactive elements, belonging for example to the group formed by U, Pu, Am, Np, Cm and the lanthanides.

The concentration of each of the radioactive elements present being generally less than or equal to 100 mg/l. For U, the concentration is preferably less than or equal to 50 mg/l and for Am and Pu it is preferably less than or equal to 1.25 mg/l.

The method according to the invention also allows the selective deposition of the silver from a solution containing these radioactive elements. This selectivity is demonstrated by the fact that the silver Ag(0) deposited at the cathode is extremely pure and that because of this, subsequent redissolution of silver metal into Ag(I) during a second step of the method gives a solution which contains a fraction of the alpha activity, generally less than 1% of the initial activity, this being a decontamination factor DF greater than 100.

Consequently, the silver metal redissolved in a nitric acid medium can be easily recycled to an upstream point of the process of leaching with electro-generated Ag(II).

Other compounds such as materials in suspension may also be present in the nitric acid solution at a concentration generally less than 100 mg/l.

According to the invention, the silver electro-deposition (recovery) step and the redissolution of the deposited silver (recycling) step take place in the same apparatus.

This apparatus is preferably an electrolytic unit without a separate compartment and with a single enclosure.

Such an apparatus has a much reduced ohmic drop and gives high current efficiencies, even in the presence of interfering cations, while the electro-deposition of the silver is quasi-quantitative and the overall yield of silver at the end of the two steps is also very high.

Such an electrolytic unit is, for example, of the type described in the document EP-A-0 449 735 and is, as shown in FIG. 1, made up of a tank (1), generally in the shape of a parallelepiped, made, for example of PVC, polyethylene, polypropylene or any other material that is inert to the solutions to be treated and the reagents used and to the electrolysis process. The tank can be in the form of two upper and lower half tanks, the upper half tank forming a detachable cover and the lower half tank forming the tank itself, these two half tanks being rigidly fixed to one another by any suitable means of fixing or attachment: hinge, flange (4) etc.

This tank is fitted at one of its ends with a feed device or pipe (2), and possibly a safety overflow, and at the other of its ends, with an orifice and an outlet or discharge pipe (3), as well as a recirculation orifice and pipe (5), these pipes being fitted with means for blocking and/or controlling the flow, such as valves (6) (7).

In addition, a branch pipe (21) is provided in the pipe (2) a little in front of the electrolytic unit, for the possible introduction of a urea solution.

The tank also includes a flange (8) in its upper part, to which a pipe is connected for the discharge of gaseous effluents which are directed, for example to a scrubbing column.

In addition, branch pipes (22, 23) are provided in the upper part of the tank, and are connected for example to a supply of carrier gas (22) such as air or a neutral gas and to a supply of water (23).

A certain number of other branch pipes (9) (only one of which is shown here) are also provided in the tank to permit the passage of sensors and/or cables connected to measurement devices or to electrodes to provide monitoring of the reaction.

For example, the electrolytic unit can be fitted, among other things, with an explosimeter sensor positioned in the discharge pipe for gaseous effluents and which allows one to monitor hydrogen release.

The electrolytic unit or electrolysis cell is fitted with one or more electrodes of opposite polarity.

The electrodes of opposite polarity can be arranged in an alternating manner as is the case for the apparatus described in document EP-A-0 449 735.

The electrode or electrodes corresponding to one of the polarities are preferably one or more electrodes of large deployed surface area, called volume lelectrodes, preferably detachable and dismountable, as described in the European patent already mentioned above. By large surface area, one generally understands an area of a few m², preferably from 1 to 10 m². The volume electrode(s) preferably constitute(s) the cathode(s) of the electrolytic unit used in the method according to the invention and is/are made up, for example of a stack of a large number (for example 10 to 25) of metal grids, for example stainless steel grids.

Because of this, the volume electrode(s), for example the cathode(s) has/have a large deployed surface area that permits current densities of 1 to 10 mA/cm², at currents of 100 to 500 A. The grids forming the cathode or cathodes can be placed in frames that ensure their rigidity, these frames being made of a material that is inert in relation to the solutions to be treated and the reagents being used, for example, these frames can be made of polyvinyl chloride, polyethylene or polypropylene.

The cathode or cathodes may also be covered with a filter cloth of high porosity, so as to restrict the formation of dendrites that are liable to cause dead short circuits between anodes and cathodes.

The electrolytic unit will preferably comprise n cathodes and n+1 anodes; for example, the electrolytic unit shown in FIG. 1 comprises 7 anodes (10) between which volume cathodes (11) are inserted.

The anodes used are made, for example of platinum or titanium treated with ruthenium or iridium, that is made of titanium covered with an electro-catalytic deposit of iridium oxide and/or ruthenium oxide.

The frame of the cathode or cathodes and the anodes are fitted with means that co-operate with means provided in the tank of the electrolytic unit and allow them to be positioned and fixed, if the need arises, in a detachable and dismountable way in the tank of the electrolytic unit. These means can be, on the one hand lugs and on the other hand grooves that co-operate with said lugs and are provided in the tank of the electrolytic unit, for example, grooves hollowed out in the wall of this tank.

The method according to the invention firstly comprises a silver electro-deposition step in which the operating parameters controlling the electrolysis are preferably perfectly controlled within specified value ranges, which provide a high current efficiency and quasi-quantitative deposition of the silver with high selectivity.

In this electro-deposition step, carried out according to the invention at a prescribed current, a low current density is applied to the cathode, preferably less than or equal to 10 mA/cm², for example 2 to 6 mA/cm², and preferably, an anti-nitrous compound such as urea is added which prevents the deposited silver Ag(0) undergoing any autocatalytic dissolution reaction by $HNO_3$.

In effect, when there is no longer enough silver in solution, the current supplied is greater than that required to reduce the silver and therefore the nitric acid is also reduced which explains why one advantageously uses anti-nitrous compounds. Therein also lies one of the preferred characteristics of the method according to the invention which advantageously requires the use of anti-nitrous compounds. The addition of such agents or anti-nitrous compounds is not mentioned in the methods where the electro-deposition is carried out at controlled potential. The anti-nitrous compound is generally chosen from among urea and oxygenated water.

Urea must generally be added initially, for example, at a concentration of 0.1 mol/l, but depending on the time required for the operations, an input may be necessary on a continuous basis from an aqueous solution of concentration 8 mol/l. The quantity of urea to be added is a function of the composition of the solutions to be treated. For nitric acid solutions such as those specified previously, the quantity of urea should generally be less than $6 \times 10^{-6}$ mol/s/A. Urea is an easily degradable reactant which has no harmful effects on subsequent parts of the process.

However, because of the fact that, apart from the formation of $N_2$, $CO_2$ and water, the use of urea could lead to the formation of ammonium nitrate, oxygenated water will preferably be used as an anti-nitrous compound at a concentration which can easily be determined by a man skilled in the art.

The silver electro-deposition step can be carried out in a discontinuous or batch-wise fashion, but it is preferably carried out with continuous recirculation of the nitric acid solution to be desilvered.

As shown in FIG. 1, the tank of the electrolytic unit (1) is supplied with the nitric acid solution to be treated using a circulation pump (12) at a regulated flow rate, measured by a rotameter (13), from a storage tank (14) or supply tank with sufficient capacity, for example 1 m$^3$ which contains the nitric acid solution to be "desilvered".

The supply pipe (also called the recirculation pipe) (15) is also fitted with means of closing it off such as valves (16, 17).

A solution of urea can generally be introduced into the circuit preferably using a branch pipe (21) provided in the pipe (2) upstream from the electrolytic unit.

The tank (14) is fitted with means that allow the temperature of the nitric acid solution to be treated to be regulated. In the Figure, these means are represented by a coil (18) that is submerged in the solution and through which a heat exchange fluid passes.

The means of regulating the temperature of the solution also comprise a temperature sensor (19).

The storage tank also has a certain number of branch pipes (20), for example for the introduction of reactants and other substances. The treated or "desilvered" nitric acid solution, having passed through this electrolytic unit, leaves the electrolytic unit through the recirculation orifice and passes through a recirculation pipe (5) fitted with a valve (6) and returns to the storage tank (14), from where it is once again sent into the electrolytic unit via the second part of the recirculation pipe (15) and the pipe (2).

Hence the electrolytic unit is supplied continuously and at a constant flow rate with the nitric acid solution that is impoverished with respect to Ag(I) on each passage through the unit while silver metal Ag(0) is deposited on the cathode or cathodes.

The recirculation is continued while following the kinetics of the electro-deposition of the silver for example by means of a potentiometer with a double platinum electrode.

The end of the electro-deposition, which corresponds for example to a Ag(I) concentration of less than 100 mg/l, is made evident by a jump in potential.

The recirculation is then stopped. The duration of the electro-deposition operation is variable and is dependent on the quantity of silver to be recovered and the current applied. It corresponds to Faraday yields of from 50 to 100%.

According to the invention, and in particular because the operating conditions are perfectly controlled and regulated using the parameters mentioned above, the recovery yield of silver is quasi-quantitative, namely greater than 99%.

Conforming to the method according to the invention, one then proceeds to the second step of the method according to the invention which is a step of redissolution of the silver deposited in the form of silver metal during the preceding electro-deposition step.

According to a fundamental characteristic of the invention, this redissolution step takes place in the same apparatus as that in which the electro-deposition step occurred, which is preferably an electrolytic unit without a separate compartment made up of a single enclosure, for example of the type already described above.

The redissolution step generally includes two steps, on the one hand a first step of emptying the apparatus in which the electro-deposition occurred and on the other hand a second step of the redissolution itself.

Emptying the unit is preferably carried out immediately after the end of the electro-deposition step and includes washing and rinsing with a rinsing fluid, preferably water, preferably demineralized water or an acid of normality less than 0.1N.

According to a preferred characteristic of the invention, it has been shown that it is preferable to inject the rinsing fluid such as the water into the apparatus such as the electrolytic unit or electrolytic cell using a piston, and at a flow rate which is preferably greater than 300 l/h for an apparatus with a volume of about 100 liters.

Under such conditions, silver losses following redissolution of the silver by $HNO_3$ are very much reduced all the more so when the dilution with nitric acid is rapid.

On the other hand and according to another preferred characteristic of the method according to the invention, the emptying is preferably carried out with a voltage of for example 12 volts being applied.

The step of redissolving the silver Ag(0) deposited on the cathode or cathodes is carried out by introducing fresh nitric acid concentrated to a concentration, for example greater than or equal to 4 mol/l, preferably 6 mol/l and preferably at zero current.

By working in this way and in particular by observing the operating conditions for the second step described above, a very high overall yield of silver is obtained for the entire method that is generally greater than 96% and even greater than 99%.

Referring to FIG. 1, the operational method of emptying the unit and redissolving the silver can be described schematically in the following way:

The emptying is carried out using the pipe (3) simply by opening the valve (7).

The rinsing can be carried out by injecting water from pipe (23).

The fresh nitric acid, for example 6N or 6 mol/l, required for the redissolution is generally contained in a tank (24), for example with a capacity of 300 liters, and is circulated using a pump 28 through pipes (25), (26) fitted with a valve (27) into the electrolytic unit and back out of it.

The silver metal recovered at the end of the first very selective electro-deposition step is of high purity and because of this, the final nitric acid solution of Ag(I) obtained after redissolution of the Ag(0) contains very few interfering ions and/or radioactive elements.

Hence the solution obtained contains a fraction of the alpha activity, generally less than 1% (Decontamination Factor DF≧100) of the initial activity and can easily be recycled, for example to an upstream point of the method.

The following examples, given for illustrative purposes and being in no way limitative show how the method of the invention is implemented.

EXAMPLE 1

In this example, the electro-deposition of Ag(0) conforming to the first step of the method according to the invention was carried out on a reduced scale.

The apparatus used comprises an electrolytic unit with a single enclosure and with no separate compartment, in the shape of a parallelepiped connected to a recirculation loop in a manner analogous to that shown in FIG. 1.

This electrolytic unit with a useful capacity of 1.5 l is fitted with two anodes made of titanium covered with an electro-catalytic deposit of iridium oxide and/or ruthenium oxide, each having a deployed surface area of 110 cm$^2$ and a cathode made of 316L stainless steel. Each of the cathodes is made up of a stack of 25 grids of size 95×115 mm with smooth uniform 0.8 mm wire; each of these cathodes has a deployed surface area of 2700 cm².

The characteristics of the nitric acid solution treated were as follows:

$HNO_3$ concentration: 4 mol/l

Ag(I) concentration: 0.05 mol/l concentration of "interfering" cations: 0 concentration of urea added initially: 0.1 mol/l volume of nitric acid treated: 10 liters.

A current of 6 A was applied to the cathode, being a cathode current density of 2 mA/cm² conforming to the invention.

The quantitative deposition of silver (Ag(0)) was observed from the nitric acid solution described above.

The current efficiency was 78%

Figure 2:
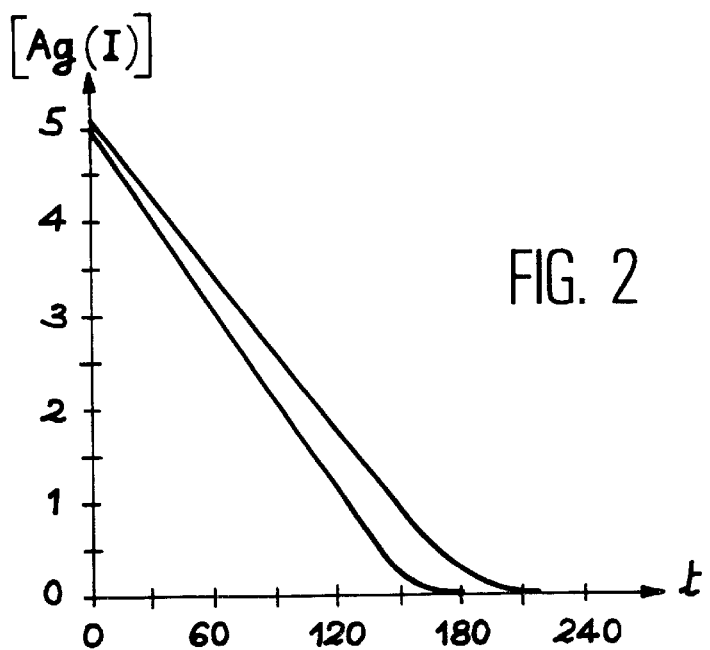
FIG. 2 is a graph illustrating the kinetics of the electro-deposition of the silver in an electrolytic unit without a separate compartment. The x-axis carries the time (expressed in minutes) and the y-axis carries the concentration of Ag(I) (expressed in mol/l×10$^{-2}$). The lower curve illustrates the electro-deposition of silver from a solution of Ag(I) that does not include interfering cations, while the upper curve illustrates the electro-deposition of silver from a solution that includes additionally interfering cations (Fe, Ni, Cr and Mn).

In FIG. 2, the lower curve illustrates the kinetics of the electro-deposition of the silver in the absence of interfering cations.

It may be observed that at the end of about 180 minutes, all of the silver in the treated solution was deposited on the cathode.

EXAMPLE 2

In this example, once again the electro-deposition of Ag(0) conforming to the first step of the method according to the invention was carried out on a reduced scale.

The same apparatus was used with the same electrolytic unit as in Example 1.

The characteristics of the nitric acid solution treated were as follows:

$HNO_3$ concentration: 4 mol/l

Ag(I) concentration: 0.05 mol/l concentration of "interfering" cations:

Fe(III): $2.50 \times 10^{-3}$ mol/l

Mn(III): $0.08 \times 10^{-3}$ mol/l

Ni(II): $0.32 \times 10^{-3}$ mol/l

Cr(III): $0.75 \times 10^{-3}$ mol/l

Total concentration of interfering cations: $3.65 \times 10^{-3}$ mol/l concentration of urea added initially: 0.1 mol/l volume of nitric acid treated: 10 liters.

A current of 6 A was applied to the cathode, being a cathode current density of 2 mA/cm² conforming to the invention.

In the same way as in Example 1, the quantitative deposition of silver (Ag(0)) was observed from the nitric acid solution described above and including interfering cations.

The current efficiency was 65%

In FIG. 2, the upper curve illustrates the kinetics of the electro-deposition of the silver in the presence of interfering cations.

It may be observed that at the end of about 210 minutes, all of the silver in the treated solution was deposited on the cathode.

EXAMPLE 3

In this example, the influence of the presence of radioactive elements is studied, these elements being present in small quantities in the nitric acid solutions made up of process solutions to be desilvered.

The radioactive elements are essentially U, Pu and Am.

Apart from these radioactive elements, the solutions also include the "interfering" cations, Fe, Cr, Mn and Ni.

The apparatus used includes an electrolytic unit with a single enclosure and with no separate compartment, identical to that in Examples 1 and 2, but adapted to the conditions for use in an active environment, that is to say, placed in a glove box.

The characteristics of the nitric acid solution treated were as follows:

$HNO_3$ concentration: 4 mol/l initial Ag concentration $5.28 \times 10^{-2}$ mol/l initial concentration of urea: 0.242 mol/l concentration of "interfering" cations:

Fe(III): $2.9 \times 10^{-3}$ mol/l

Ni(II): $3.5 \times 10^{-4}$ mol/l

Cr(III): $8 \times 10^{-4}$ mol/l

Mn(III): $9 \times 10^{-5}$ mol/l

Total concentration of interfering cations: $4.14 \times 10^{-3}$ mol/l concentration of radioactive elements Pu: 1.5 mg/l U: 50 mg/l Am: 0.1 mg/l total concentration of radioactive elements: 51.6 mg/l volume of nitric acid treated: 1.7 liters.

A current of 6 A was applied, being a cathode current density of 2 mA/cm².

More than 99% of the initial silver was electro-deposited in 25 minutes with a current efficiency of 87%.

This deposition is carried out in an extremely selective manner, since redissolution of Ag(0) to Ag(I) by $HNO_3$ in a subsequent step contains a fraction of the alpha activity that is less than or equal to 1% of the initial activity.

This residual activity corresponds to the retention volume of the electrolytic unit, essentially at the cathode, after emptying the solution to be desilvered and without rinsing with water from the electrolytic unit.

EXAMPLE 4

In this example, the recovery of silver by electro-deposition is being carried out on a semi-industrial scale, from a nitric acid solution containing, apart from Ag(I), interfering cations or impurities, mainly compounds of Fe, Ni, Cr and Mn.

The apparatus used conforms to that described in FIG. 1 and comprises an electrolytic unit and a supply tank containing the nitric acid solution to be desilvered.

The electrolytic unit in the shape of a parallelepiped manufactured in PVC has a capacity of 100 l and is supplied with the solution to be desilvered by a circulation pump at a flow rate of 13 m³/h from the 1 m³ storage tank.

The electrolytic unit is, as shown in FIG. 1, fitted with 6 volume cathodes with grids made of 316L stainless steel having a surface area of 16 m² and 7 platinum anodes with a surface area of 0.7 m².

The stacks of grids that constitute the cathodes are positioned in frames that ensure their rigidity.

These frames and the different anodes are positioned in the electrolytic unit in grooves hollowed out in the reactor.

The nitric acid solution with 1 m³ containing 5 kg of silver has a $HNO_3$ concentration of 4 mol/l.

This solution also contains the following concentrations of interfering cations:

Fe: $2.9 \times 10^{-3}$ mol/l

Mn: $9 \times 10^{-5}$ mol/l

Cr: $8 \times 10^{-4}$ mol/l

Ni: $3.5 \times 10^{-4}$ mol/l

The recirculation flow rate was adjusted to 13 m³/h and a current of 400 A was applied being a cathode current density of 2.5 mA/cm² conforming to the invention.

The temperature of the solution was adjusted to 22–25° C.

Five tests were carried out, every time varying the urea concentration within different ranges: respectively 0.07 to 0.13 mol/l; 0.02 to 0.07 mol/l; 0.02 to 0.03 mol/l; 0.04 to 0.06 mol/l and finally 0.06 to 0.11 mol/l, the other operating parameters remaining unchanged.

The supply of urea is carried out continuously at a flow rate of from 11 to 22 mol/h of urea by adding an aqueous solution of urea at 8 mol/l.

For the five tests carried out, three types of on-line monitoring were used
- the release of hydrogen into the gaseous effluent circuit with an explosimeter sensor
- the all or nothing monitoring of [Ag(I)] by potentiometry with a platinum double electrode
- the spectrophotometric monitoring of $HNO_2$ at 370 nm.

TABLE I

Result of experiments involving the electro-deposition of 5 kg of silver from 1 m³ of 4M $HNO_3$ containing inactive impurities.

| Test No. | Concentration range of urea | [Ag] final (mg/l) | Duration of the electrolysis | Yield (%) of the silver electro-deposition | Current efficiency % |
|---|---|---|---|---|---|
| 1 | 0.07 to 0.13 | 3 | 5 h 15 | 99.4 | 70 |
| 2 | 0.02 to 0.07 | 3 | 5 h 15 | 99.9 | 71 |
| 3 | 0.02 to 0.03 | 4 | 4 h 30 | 99.9 | 70 |
| 4 | 0.04 to 0.06 | 9 | 5 h | 99.9 | 70 |
| 5 | 0.06 to 0.11 | <3 | 5 h | 99.9 | 64 |

The Table shows that the 5 kg of silver are electro-deposited with silver yields greater than 99% over a period of 4 h 30 and 5 h 15.

The current efficiencies are from 64 to 70%.

Monitoring of the release of hydrogen allowed one to demonstrate the quasi-absence of electrolytically generated hydrogen during the electro-deposition of silver and notably at the end of the electrolysis where $H_2$<1% ppv.

Potentiometry with a double platinum electrode with a proscribed current of i=600 µA enabled the end of the electro-deposition of the silver to be made evident for a Ag(I) threshold of <100 mg/l.

A jump in potential of 200 mV is observed.

During the entire period of the electrolysis, the addition of urea at the rate of $3.10 \times 10^{-3}$ mol/s, or $7.5 \times 10^{-6}$ mol/s/A did not allow the detection (by measurement of optical density) of any significant concentration of $HNO_2$.

What is claimed is:

1. Electrolytic method for the selective recovery and recycling of silver from a nitric acid solution containing silver in the form of Ag(I), comprising the successive steps of the electro-deposition of the silver in the form of silver metal Ag(0) and then the redissolution of the deposited silver Ag(0), to give a final solution of Ag(I) in which said step of electro-deposition is carried out at a prescribed current and said successive steps of electro-deposition of the silver and redissolution of the deposited silver are carried out in the same apparatus.

2. Method according to claim 1, characterized in that said apparatus is an electrolytic unit with a single enclosure, without a separate compartment.

3. Method according to claim 2, characterized in that the electrolytic unit comprises one or more scathodes with a large deployed surface area.

4. Method according to claim 1, characterized in that the initial solution contains silver Ag(I) at a concentration of from 0.01 to 0.1 mol/l.

5. Method according to claim 1, characterized in that the initial solution contains nitric acid at a concentration of from 0.1 to 6 mol/l.

6. Method according to claim 1, characterized in that the initial solution contains, apart from the silver, one or more metal cations belonging to the group made up of Fe, Ni, Cr, Mn, Mg and Zn.

7. Method according to claim 6, characterized in that the concentration of each of the cations present is less than or equal to 0.1 mol/l.

8. Method according to claim 1, characterized in that the initial solution includes one or more radioactive elements belonging to the group made up of U, Pu, Am, Np, Cm and the lanthanides.

9. Method according to claim 8, characterized in that the concentration of each of the radioactive elements present is less than or equal to 100 mg/l.

10. Method according to claim 1, characterized in that said step of electro-deposition of the silver is carried out at a cathode current density less than or equal to 10 mA/cm².

11. Method according to claim 1, characterized in that an anti-nitrous agent is added during the electro-deposition step.

12. Method according to claim 11, characterized in that said anti-nitrous compound is chosen from among urea and oxygenated water.

13. Method according to claim 12, characterized in that the urea is added continuously at the rate of about $6 \times 10^{-6}$ mol/s/A.

14. Method according to claim 1, characterized in that said step of redissolution includes a first step of emptying said apparatus and a second step of redissolving the Ag(0) deposited on the cathode or cathodes.

15. Method according to claim 14, characterized in that said step of emptying is carried out with a voltage applied.

16. Method according to claim 14, characterized in that said step of emptying comprises rinsing said apparatus with a rinsing fluid.

17. Method according to claim 16, characterized in that said rinsing fluid is injected by a piston at a flow rate greater than 300 l/h.

18. Method according to claim 14, characterized in that said step of redissolving the silver Ag(0) deposited on the cathode or cathodes is carried out by introducing fresh nitric acid at a concentration greater than or equal to 4 mol/l.

19. Method according to claim 14, characterized in that said redissolving step itself is carried out with zero current.

* * * * *

UNITED STATES PATENT AND TRADEMARK OFFICE
CERTIFICATE OF CORRECTION

PATENT NO. : 6,428,679 B1
DATED : August 6, 2002
INVENTOR(S) : Jacques Bourges et al.

It is certified that error appears in the above-identified patent and that said Letters Patent is hereby corrected as shown below:

<u>Title page,</u>
Item [73], Assignees, "Valizy" should be -- Velizy --.
Item [56], References Cited, U.S. PATENT DOCUMENTS, the following should be included:
-- 4,226,685    10/1980    Portal et al. ......................204/105R
   5,250,166    10/1993    Motojima et al. ..................204/222 --

Item [56], after last cited U.S. PATENT DOCUMENTS,
-- FOREIGN PATENT DOCUMENTS add:
FR    704,663    5/1931
EP   0  449 735    10/1991 ..........................CO2F/1/46
WO WO89/10981  11/1989 .........................C22B/3/00 --
Item [56], OTHER PUBLICATIONS, add:
-- M. Lecomte et al., Applications due procede de dissolution oxydante du bioxyde de plutonium in Proceedings of the In. Conf. on Nucl. Fuel Reprocessing and Waste Management Recod 87, vol. 1, pg. 444, 1987
F. J. Poncelet et al., Industrial Use of Electro-generated (ag(ii) for Pu02 Dissolution Recod 97 Proceedings, vol. II, pgs. 24 - 28, April 1994, London, U.K. --

<u>Column 12,</u>
Line 8, change "scathodes" to -- cathodes --.

Signed and Sealed this

Twelfth Day of August, 2003

JAMES E. ROGAN
*Director of the United States Patent and Trademark Office*